United States Patent [19]

Kiwaki et al.

[11] 4,306,283

[45] Dec. 15, 1981

[54] POWER FACTOR IMPROVING APPARATUS FOR POWER CONVERTER

[75] Inventors: Hisakatsu Kiwaki, Katsuta; Kyozo Tachibana, Kamikashiomachi; Yoshimitsu Onoda, Katsuta; Katsuaki Suzuki, Kitaibaraki; Tatsuo Horie, Mito; Yutaka Suzuki; Shozuchi Miura, both of Hitachi, all of Japan

[73] Assignee: Hitachi, Ltd., Tokyo, Japan

[21] Appl. No.: 114,688

[22] Filed: Jan. 23, 1980

[30] Foreign Application Priority Data

Jan. 24, 1979 [JP] Japan .................................. 54-6078

[51] Int. Cl.³ ........................ G05F 1/70; H02M 7/155
[52] U.S. Cl. ...................................... 363/68; 323/207; 323/210
[58] Field of Search ........................ 363/65, 67–68, 363/85; 323/102, 105, 119, 124, 125, 128

[56] References Cited

U.S. PATENT DOCUMENTS

| | | | |
|---|---|---|---|
| 3,932,808 | 1/1976 | Frank | 323/102 |
| 4,020,411 | 4/1977 | Tsuboi et al. | 363/68 |
| 4,144,559 | 3/1979 | Okumura et al. | 363/68 X |
| 4,181,932 | 1/1980 | Fujiwara | 363/68 |

OTHER PUBLICATIONS

T. I. Nordin et al.; "Advantages of Thyristor Locomotives and Experience in Sweden", IEEE Transactions on Industrial Application, vol. IA-8, No. 3, May/Jun. 1972, pp. 316–337.

Primary Examiner—William M. Shoop
Assistant Examiner—Peter S. Wong
Attorney, Agent, or Firm—Craig and Antonelli

[57] ABSTRACT

The two secondary windings of a transformer the primary winding of which is connected to an AC power supply are each provided with a controlled rectifying circuit. The DC sides of the rectifying circuits are connected in series to supply power to DC motors. One of the secondary windings is detachably connected with a capacitor bank. The capacity of the capacitor bank is selected so that the power factor of the converter can be improved to a satisfactory value when the two rectifying circuits are both controlled to produce output voltages. The capacitor bank becomes connected in response to the fact that the current in the primary winding of a transformer has arrived at a predetermined value.

10 Claims, 14 Drawing Figures

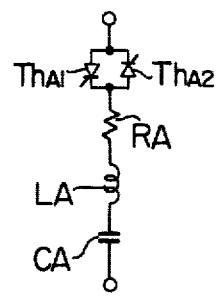
FIG. 2A
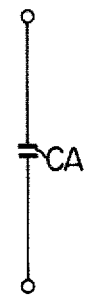
FIG. 2B
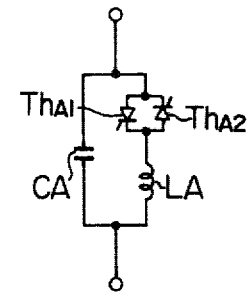
FIG. 2C
FIG. 4
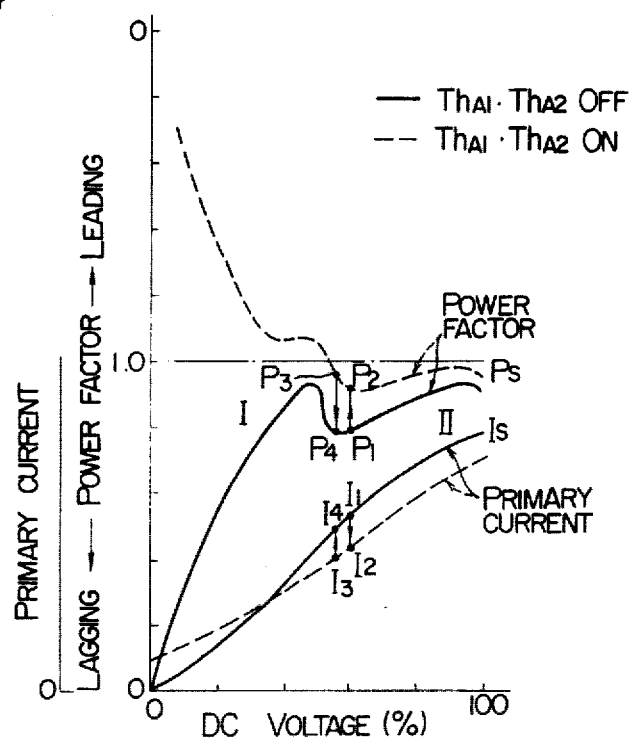
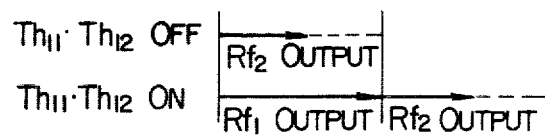

POWER FACTOR IMPROVING APPARATUS FOR POWER CONVERTER

The present invention relates to power factor improving apparatus for power converter and particularly to a power factor improving apparatus for power converter in which a plurality of controlled rectifying circuits are connected in cascade to supply power to driving DC motors and which is suitable for use in AC-system electric railway cars.

Generally in the AC electric railway car, single-phase AC power is supplied to aerial conductor from which the electric car is supplied with power. The AC power is then converted to DC power by controlled rectifiers, thus driving DC motors. In this case, a relatively low-voltage large current flows in the aerial conductor and, to supress the short-circuit current, drop across reactance becomes relatively large, so that reactive power often becomes a problem. Therefore, it is desired to reduce the reactive power and improve power factor.

The control of the controlled rectifiers is based on the phase control of AC voltage, so that in general, power factor is remarkably reduced and the reactive power is further increased. Moreover, there is a problem that harmonics increase, adversely affecting AC power supply system and neighboring communication lines.

In order to solve these problems, there has been practically used a so-called cascade-connection control system in which the AC power is divided by a transformer into multiple power sources, which are supplied to controlled rectifiers thereby converted to variable DC voltages, and the respective DC outputs are connected in cascade to supply DC power to motors. In the system, the larger the number of the power division, the more effective are the power factor improvement and the reduction of harmonics. However, the construction of transformer, controlled rectifier circuit and firing control circuit become complicated so as to be expensive and the reliability thereof is reduced. Therefore, it is preferable to divide AC power by, at most, 6 and, for practical use, by about 2, but improvement for power factor and reduction of harmonics become insufficient.

Thus, there has been proposed a so-called forced extinguishing system in which controlled rectifiers are forcibly turned off at a phase leading polarity reversing phase of AC power supply voltage so as to further improve power factor, and which is disclosed, for example, in Japanese Pat. No. 727,501.

The system using the forced extingushing circuit makes circuit arrangement complicated and must use auxiliary thyristors and diodes for extinguishing, the breakdown voltages of which are higher than the required breakdown voltages of main thyristors used. Moreover, there is a problem that harmonic components are further increased along with the forced extinguishing operation.

On the other hand, there has been proposed an arrangement in which capacitor banks for improving power factor can be connected to a plurality of secondary windings of a transformer to which controlled rectifying circuits are connected, in IEEE Transaction on Industry Application, Vol. IA-8, No. 3, May/June 1972, p316-337.

However, this arrangement requires capacitor banks the number of which corresponds to that of the controlled rectifying circuits, and use of many capacitor banks will make the arrangement complicated. Moreover, the size of the capacitor bank becomes large and causes a problem particularly when a number of apparatus, instruments and devices are provided or loaded in a limited space as in railway cars.

Accordingly, it is an object to provide a power converter with capacitor banks capable of simply and economically compensating for reactive power irrespective of the number by which the AC power is divided.

A power factor improving apparatus for power converter according to the present invention comprises: a transformer having a primary winding connected to an AC power supply and a plurality of secondary windings; a power converter formed of a plurality of controlled rectifying circuits the AC sides of which are connected to the secondary windings and the DC sides of which are connected in cascade with respect to a DC load; a control means for phase-controlling only one of the plurality of controlled rectifying circuits so that two or more of the plurality of controlled rectifying circuits are never phase controlled at the same time, and for selectively fixing the others to either of the minimum and maximum output states; and capacitor banks for improving power factor of the power converter; wherein means having only one of the capacitor banks is provided for connecting this only capacitor bank to only one of the secondary windings to which one of the controlled rectifying circuits is connected.

Other objects, features and advantages of this invention will become apparent from the following description taken in conjunction with th accompanying drawings, in which:

FIGS. 2A to 2C show various modifications of the capacitor bank;

FIG. 4 is a graph useful for explaining its operation and characteristics;

Figure 1:
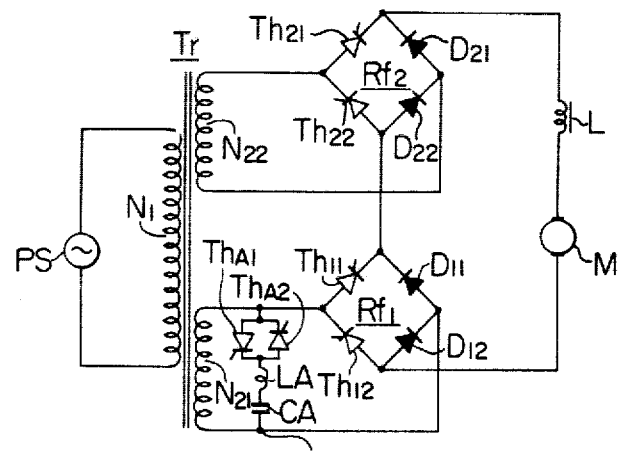
FIG. 1 is a circuit diagram of one embodiment of a power factor improving apparatus for power converter according to the present invention.

Some embodiments of the present invention will hereinafter be described in detail with reference to the accompanying drawings. A first embodiment of the invention, as shown in FIG. 1, comprises: a transformer Tr with a primary winding $N_1$ connected to an AC power supply PS and with two secondary windings $N_{21}$ and $N_{22}$; a controlled rectifying circuit $R_{f1}$ consisting of thyristors $Th_{11}$ and $Th_{12}$ and diodes $D_{11}$ and $D_{12}$ and which is connected to the secondary winding $N_{21}$; a controlled rectifying circuit $R_{f2}$ consisting of thyristors $Th_{21}$ and $Th_{22}$ and diodes $D_{21}$ and $D_{22}$ and which is connected to the secondary winding $N_{22}$; a reactor L by which the rectified voltage from the cascade-connected controlled rectifying circuits $R_{f1}$ and $R_{f2}$ is smoothed and supplied to a DC motor M; and a capacitor bank CLC consisting of thyristors $Th_{A1}$ and $Th_{A2}$ parallel-connected in reverse polarity, a reactor $L_A$ and a capacitor $C_A$, and which is connected to the secondary winding $N_{21}$ of the transformer Tr. In the capacitor bank CLC, the series circuit of the reactor $L_A$ and capacitor $C_A$ has a resonant frequency equal to or higher than the third harmonic of a fundamental wave and thus provides a leading current for the fundamental wave. The parallel circuit of the thyristors $Th_{A1}$ and $Th_{A2}$ in reverse polarity acts as a contactless switch.

Operation will now be described. When neither of the rectifiers $R_{f1}$ and $R_{f2}$ as components are in rectifying operation, no reactive power takes place and thus the capacitor bank CLC is in the open state. This capacitor bank CLC is closed when the rectifier $R_{f1}$ or $R_{f2}$ as a component produces lagging compensating power corresponding to the leading compensating power produced by th CLC. The capacitor bank CLC is closed by turning on the thyristors $Th_{A1}$ and $Th_{A2}$. The internal resistance of the capacitor bank CLC is selected to be small, while the internal resistances of the AC power supply PS, transformer Tr and other circuits should be as small as possible within an allowable range. Therefore, a substantially constant amount of leading reactive current is induced in the capacitor bank CLC by the AC power supply PS irrespective of the action of the rectifiers $R_{f1}$ and $R_{f2}$. The leading reactive power due to this leading reactive current offsets the lagging reactive power in the rectifiers $R_{f1}$ and $R_{f2}$, thus compensating for the reactive power by a constant level.

As described above, the reactive power to the power converter increases during phase control, but when the power converter is divided into individual control rectifying circuits, or partial converters as shown in FIG. 1, it is usual to separately control them and thereby to decrease reactive power. For example, a stacked control system as it is called will be described with reference to FIG. 1. The rectifier $R_{f1}$ is first controlled in phase, and at this time the rectifier $R_{f2}$ produces no reactive power. When the rectifier $R_{f1}$ is phase-controlled up to a limit, it is started to phase control the rectifier $R_{f2}$ at which time the rectifier $R_{f1}$ produces a small reactive power. In this case, the output from the partial converter is a small part of the whole output and thus a reactive power produced by each partial converter is also small. It is thus apparent that reactive power to be compensated may be small in the divided-type converter.

The first feature of this embodiment is that the capacitor bank CLC used is simple in circuit arrangement. The second feature of this embodiment is that irrespective of whether the capacitor bank CLC is connected or not, the voltage induced in the secondary winding $N_{21}$ of the transformer Tr is constant determined by the voltage of the AC power supply PS and the turn ratio of the transformer Tr and never exceeds the breakdown voltages of the thristors $Th_{11}$, $Th_{12}$, $Th_{A1}$ and $Th_{A2}$ and diodes $D_{11}$ and $D_{12}$.

Comparing a device in which each secondary winding has a capacitor bank with the device like this embodiment in which any one of secondary windings has a capacitor bank, since a series resonance circuit is constructed by a capacitor of the capacitor bank and reactances of the transformer and transmission lines, the more there are capacitor banks, the higher the resonance frequency at which the series resonance circuit is resonant with a harmonic frequency becomes. Accordingly, when a thyristor device used in the electric car produces a harmonic component of source frequency, a large harmonic current flows through the transmission lines due to resonance, as a result, undesirable loss, calorification and noise are caused not only to the main transformer and capacitor bank of the electric car but to the substation equipment. On the other hand, in this embodiment, since the capacitor bank is located on a single position, such disadvantages are reduced in satisfactory state. For example, on condition that an electric locomotive using a thyristor type power converter having a transformer in which the rated output 3000 kW, the rated voltage 25 kV, the rated frequency 50 Hz and of which the secondary circuit is divided into four control rectifying circuits runs within distance of 0 to 20 km from the substation, the third harmonic current is calculated which produces the most harmful influence among harmonic currents from the thyristor device flowing through the transmission lines. In case the capacitor banks are located on four control rectifying circuits respectively, the third harmonic resonance current flows about 2.7 times in comparison with non-resonance current, while in this embodiment the third harmonic resonance current is reduced to about 1.4 times in comparison with non-resonance current.

If a well known stacked control system is used to increase or decrease the output voltage by phase-controlling a plurality of control rectifying circuits $R_{f1}$ and $R_{f2}$ in turn as described above, it is preferable to control the control rectifying circuits in the order of $R_{f2}$ and $R_{f1}$, not of $R_{f1}$ and $R_{f2}$.

In other words, the procedure of controlling is as follows. When the output voltage is increased, the controlled rectifying circuit $R_{f2}$ is phase-controlled and reaches the maximum output voltage at which time the rectifier $R_{f1}$ is phase-controlled with the rectifier $R_{f2}$ being kept at that controlled condition. When the output is decreased, similar operation is performed in the reverse order.

The reason why the control is performed is that in general the controlled state in which a plurality of controlled rectifying circuits $R_{f1}$ and $R_{f2}$ produce output voltages (or the rectifier $R_{f2}$ is fixed at the condition of the maximum output voltage and the rectifier $R_{f1}$ is phase controlled) occupies a large part of the whole period of time and particularly it is remarkable in the application to AC electric cars. Therefore, the power factor of the converter must be improved in such period of time. Although there is no period of time in which a plurality of controlled rectifying circuits are phase controlled simultaneously, the capacitor bank for improving power factor is required to have the larger capacity, the larger the total output. Therefore, the capacitor bank CLC should be operated only when the rectifier $R_{f2}$ is at the maximum output voltage and the rectifier $R_{f1}$ is phase-controlled. Since at this time the capacitor bank CLC is directly connected to the AC side of the rectifier $R_{f1}$ at phase-controlled state, it is more effectively possible to improve the power factor. Particularly inductive disturbance to the external can effectively be reduced which is caused by phase-controlling the controlled rectifying circuit $R_{f1}$. Moreover, the equivalent interference current JP generally used as an index for expressing the degree of inductive disturbance can be reduced by about 10% as compared with the foregoing.

There is another well-known control system called vernier notching control system, wich uses a plurality of controlled rectifying circuits.

This control system employs only one phase-controlled rectifying ciruict, for example, $R_{f1}$. The other controlled circuit $R_{f2}$ is selectively fixed to either of the minimum and maximum output voltages. In other words, the procedure of controlling is as follows.

When the output voltage is increased, the controlled rectifying circuit $R_{f1}$ is phase-controlled and reaches the maximum output voltage. Then, this output voltage is transferred to the rectifier $R_{f2}$ (the rectifier $R_{f2}$ is fixed to the maximum output voltage and at the same time the rectifier $R_{f1}$ is returned to the minimum output voltage) and the rectifier $R_{f1}$ is phase-controlled. When the output is decreased, the reverse procedure to the above is performed.

In this control system, the capacitor bank CLC is connected to the AC side of only the controlled rectifying circuit $R_{f1}$ is phase-controlled, and thus it can easily be understood that all the effects in the stacked control system described above can be attained. If the capacity of the capacitor bank is properly selected, only the rectifier $R_{f1}$ which is phase-controlled produces output voltage, so that even when the other rectifier $R_{f2}$ is fixed to the minimum output voltage, the capacitor bank can be connected thereby to effectively achieve improved power factor and reduced inductive disturbance.

While the capacitor bank CLC in the above-described embodiment is formed by the parallel circuit of the thyristors $Th_{A1}$ and $Th_{A2}$ in the reverse polarity and the series circuit of the reactor $L_A$ and capacitor $C_A$, the capacitor bank CLC may be formed of another circuit. For example, as shown in FIG. 2A, a resistor $R_A$ can be additionally connected to the series circuit as mentioned above. In this case, this resistor $R_A$ serves to reduce the transient unstable vibration caused by the reactor $L_A$ and capacitor $C_A$. Moreover, as shown in FIG. 2B, only the capacitor may be used for the capacitor bank CLC, and is effective when the transient vibration in the circuit is not a problem. As shown in FIG. 2C the capacitor $C_A$ may be connected in parallel with the circuit of thyristors $Th_{A1}$ and $Th_{A2}$ and reactor $L_A$. In this case, the thyristors $Th_{A1}$ and $Th_{A2}$ serve to adjust the magnitude of current in the reactor $L_A$, and the phase at which the thyristors $Th_{A1}$ and $Th_{A2}$ turn on is controlled thereby to change the amount of compensation for the reactive power. The capacitor bank CLC may be a combination of these circuits or a modified circuit.

Figure 3:
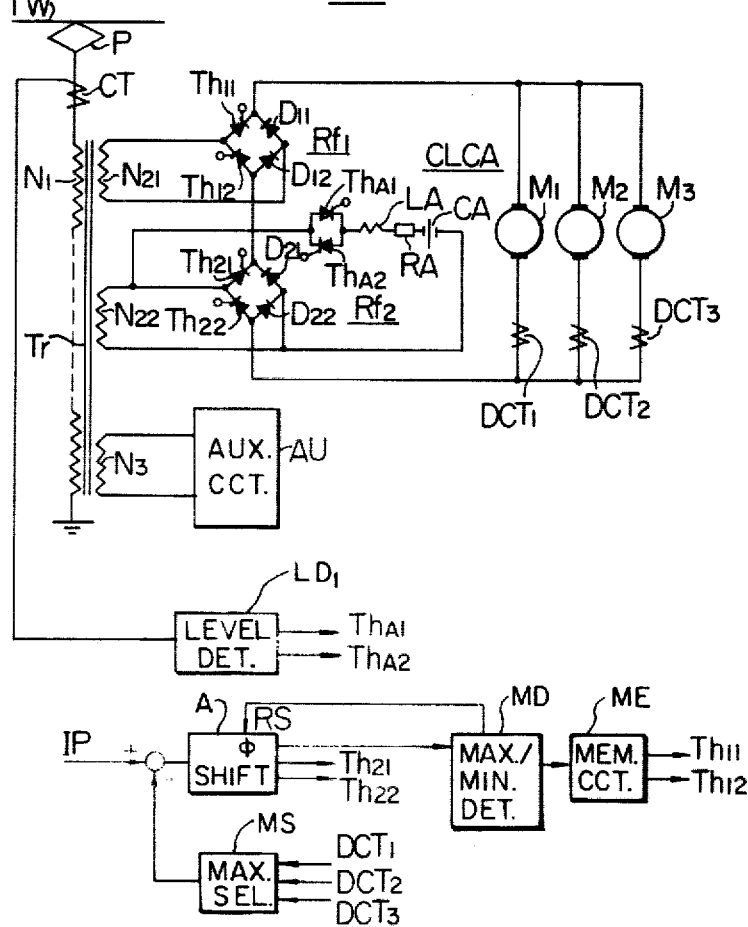
FIG. 3 shows a main circuit and a control circuit in the case where the present invention is applied to an AC electric car so as to control by the vernier notching control system.

FIG. 3 shows another embodiment of the power converter according to the present invention. This embodiment is the application of the present invention to the control circuit for vehicles of AC electric railway. AC power is supplied from an aerial conductor TW through a pantograph P to the primary winding $N_1$ of the transformer Tr. The induced voltages in the secondary windings $N_{21}$ and $N_{22}$ are rectified by the rectifiers $R_{f1}$ and $R_{f2}$ into DC voltages, respectively. These rectifiers $R_{f1}$ and $R_{f2}$ are connected in cascade and DC motors $M_1$ to $M_3$ for driving the electric car are connected as loads across the cascade-connected rectifiers $R_{f1}$ and $R_{f2}$. Moreover, an auxiliary circuit AU is connected to a tertiary winding $N_3$ of the transformer Tr, and a capacitor bank CLCA is connected in parallel with the rectifier $R_{f2}$ across the secondary winding $N_{22}$. This circuit CLCA serves as a capacitor bank CLC and includes the parallel circuit of thyristors $Th_{A1}$ and $Th_{A2}$ connected in the opposite directions, rush current suppressing reactor $L_A$, damping resistor $R_A$ and phase-advancing capacitor $C_A$.

The rectifier $R_{f1}$ is a mixing bridge circuit consisting of thyristors $Th_{11}$ and $Th_{12}$ and diodes $D_{11}$ and $D_{12}$ and the rectifier $R_{f2}$ is a mixing bridge circuit consisting of thyristors $Th_{21}$ and $Th_{22}$ and diodes $D_{21}$ and $D_{22}$. The turning-on control in the vernier notching control system is performed as follows. The maximum values of the outputs of the DC current transformers $DCT_1$ to $DCT_3$ inserted in the respective motor circuits are selected and detected by a maximum value selector MS. The output of the selector MS and a command current Ip are supplied to a subtracter, the difference output from which is amplified by an amplifying phase shifter A. The output from the shifter A is converted to signals having phases necessary for turning the thyristors $Th_{21}$ and $Th_{22}$ on, thus these signals being supplied to the thyristors $Th_{21}$ and $Th_{22}$. Therefore, the thyristors $Th_{21}$ and $Th_{22}$ are turned on to conduct DC current, which flows through the diodes $D_{12}$ and $D_{11}$ of the rectifier $R_{f1}$ to the motors $M_1$ to $M_3$. Thus, automatic control can be performed so that the maximum current thereof becomes equal to the current Ip.

As the DC motors $M_1$ to $M_3$ increase their speeds, the output from the amplifying phase shifter A advances in phase so as to make the motor current equal to the command current Ip. When the phase of the output from the amplifying phase shifter A reaches substantially the maximum, a maximum or minimum detector MD produces an output signal, which is then supplied to a storage circuit ME, while a reset signal RS is supplied to the amplifying phase shifter A. Thus, the storage circuit ME produces signals for turning the thyristors $Th_{11}$ and $Th_{12}$ on, and the rectifier $R_{f1}$ produces approximately the same DC voltage as the voltage which the rectifier $R_{f2}$ has produced so far. However, since the amplifying phase shifter A is reset and the output is returned to the minimum, the thyristors $Th_{21}$ and $Th_{22}$ are once turned off, and consequently the rectifier $R_{f2}$ produces zero output, but the motor current continuously flows through the diodes $D_{21}$ and $D_{22}$ of the rectifier $R_{f2}$ by the output of the rectifier $R_{f1}$.

The thyristors $Th_{21}$ and $Th_{22}$ are again turned on by firing phase control, and thus automatic control continues so as to make the maximum value of the motor currents equal to the command current Ip.

If the DC motors $M_1$ to $M_3$ decrease their speeds because of a steep ascent of railways or the like, the motor currents tend to increase. Consequently, the output of the amplifying phase shifter A decreases and finally reaches substantially the minimum. At this time, the maximum or minimum detector MD detects the minimum thereby causing the output from the memory circuit ME to be zero, while the reset signal RS is supplied to the amplifying phase shifter A to increase its output to the maximum. Thus, the rectifier $R_{f1}$ produces zero output and the rectifier $R_{f2}$ produces substantially the maximum output. Thereafter, the motor currents are automatically controlled by firing phase control of the thyristors $Th_{21}$ and $Th_{22}$.

In this case, the DC voltage to the motors $M_1$ to $M_3$ as shown in FIG. 4 is supplied by the rectifier $R_{f2}$ when the voltage is within about 50% of the maximum, and by both the rectifiers $R_{f1}$ and $R_{f2}$ when the voltage exceeds 50% thereof. Therefore, the power factor of the primary current of the transformer is the same as in the characteristics of the known cascade control circuit as shown in FIG. 4 by the solid line I. At this time the primary current changes as shown in FIG. 4 by solid line II. However, the auxiliary circuit component is excluded.

On the other hand, the CLCA is assumed to have a capacity necessary for the power factor $P_S$ of primary current to be made sufficiently close to 1 at the maximum of the DC voltage. The broken lines in FIG. 4 indicate primary current and power factor when the thyristors $Th_{A1}$ and $TH_{A2}$ to turn on.

In order to control the thyristors $Th_{A1}$ and $Th_{A2}$ to turn on or off, there is provided a level detector $LD_1$ for detecting the output from the current transformer CT for detection of the primary current of the transformer. When the level detector $LD_1$ produces output, the thyristors $Th_{A1}$ and $Th_{A2}$ are turned on.

In AC electric cars, improvement of power factor and reduction of harmonics become the more important, the larger the power supplied to the transformer as in the embodiment of FIG. 3. It is also important not to make the power factor be advanced by a phase advancing circuit upon light load and not to cause unnecessary power loss due to the phase-advancing circuit current.

Thus, in this embodiment, the operation level of the level detector $LD_1$ is set to the value $I_1$ of about ½ the maximum $I_s$ of the primary current of the transformer as shown in FIG. 4. When the primary current of transformer exceeds $I_1$, the level detector $LD_1$ produces output, and the thyristors $Th_{A1}$ and $Th_{A2}$ are turned on. Thus, the series circuit of the reactor $L_A$, resistor $R_A$ and capacitor $C_A$ is connected in parallel with the secondary winding $N_{22}$ and the primary current and its power factor are changed from $I_1$ and $P_1$ to $I_2$ and $P_2$, respectively. The return level of the level detector $LD_1$ has a hysteresis to be $I_3$ of the primary current.

Thus, when the DC voltage is further increased after the level detector $LD_1$ has operated, the power factor changes to Ps along the broken line and therefore is more improved than that of the solid line I, that is, before the thyristors $Th_{A1}$ and $Th_{A2}$ are turned on. In this case, the filtering effect of the reactor $L_A$ and capacitor $C_A$ substantially reduces the harmonics generated from the rectifier circuit $R_{f2}$.

If the DC voltage is increased, when the primary current reaches $I_3$, the level detector $LD_1$ is returned to the original state and the thyristors $Th_{A1}$ and $Th_{A2}$ are turned off. As a result, the primary current of transformer and its power factor are changed from $I_3$ and $P_3$ to $I_4$ and $P_4$, respectively, preventing power factor from advancing below the DC voltage and, unnecessary loss due to phase advancing circuit current from occuring.

According to the embodiment, since the rectifier $R_{f1}$ is controlled to be on or off, power factor is slightly reduced and harmonics are little generated. Therefore, the capacitor bank CLC is connected to only the AC side of the rectifier $R_{f2}$ which performs continuous control, thereby improving power factor simply and economically which leads to effective reduction of harmonics on the total output including the on-off control groups.

Moreover, the capacitor bank CLC operates in the range in which primary current is great, preventing leading power factor and unnecessary loss due to the CLC current.

While the secondary winding of the transformer Tr is divided in two two parts in this embodiment, the secondary winding may be divided into, for example, 4 and 6 parts in which one group alone undergoes coninuous control and the other groups undergo on-off control. In this case, if the capacitor bank CLC is connected to only the continuously controlled group, the same effect of improving power factor can be achieved. Thus, use of single capacitor bank CLC enables improvement in power factor on the total output of a plurality of controlled rectifying circuits irrespective of the number of the divided parts.

Figure 5A:
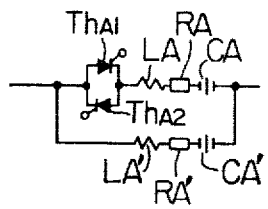
FIGS. 5A and 5B show various modifications of the capacitor bank.
Figure 5B:
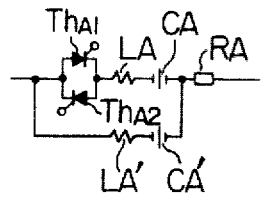

When the auxiliary circuits AU is of a low power factor or when a certain degree of improvement in power factor is required even in the range where primary current is below $I_4$, a reactor $L_A'$, a resistor $R_A'$ and a capacitor $C_A'$ can be connected to part of the capacitor bank CLC as shown in FIGS. 5A and 5B thereby to act as a phase-advancing circuit irrespective of whether the thyristors $Th_{A1}$ and $Th_{A2}$ are turned on or off. The reactors $L_A$ and $L_A'$ can be replaced by the anode reactor of the thyristors $Th_{A1}$ and $Th_{A2}$ or by the reactance of wiring.

Figure 6:
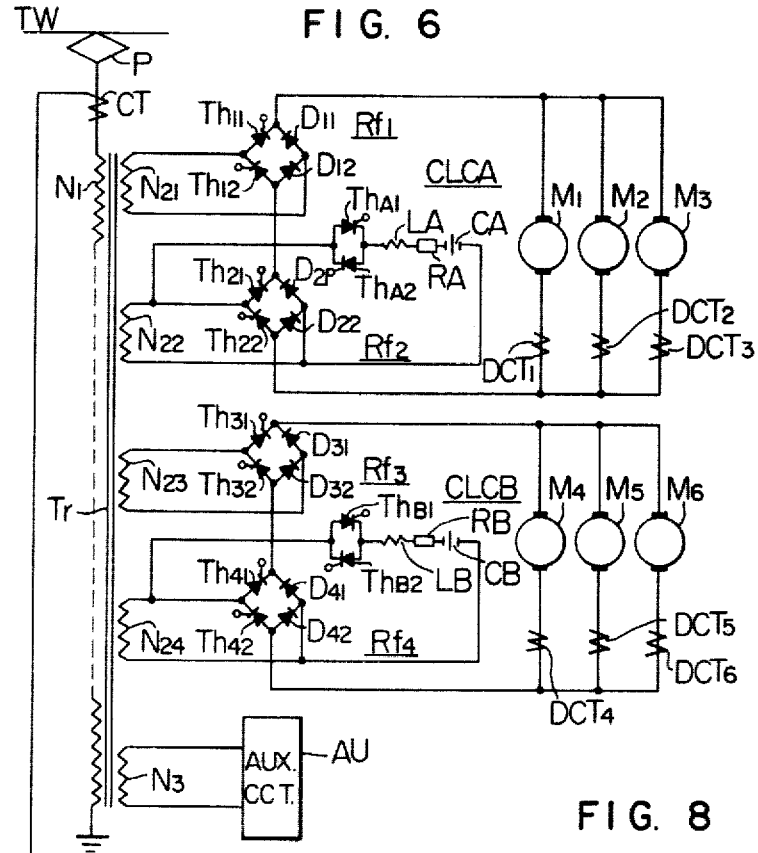
FIG. 6 shows another different application of the invention to an AC electric car.

FIG. 6 shows still another embodiment of the present invention. In this embodiment, the transformer Tr is provided with secondary windings $N_{23}$ and $N_{24}$, the voltages induced therein being converted by rectifiers $R_{f3}$ and $R_{f4}$ into DC voltages. The rectifiers $R_{f3}$ and $R_{f4}$ are connected in cascade. This embodiment is different from the previous embodiment in that in addition to the DC motors $M_1$ to $M_3$ provided on one truck of an electric car. DC motors $M_4$ to $M_6$ for driving are provided as loads on the other truck of the electric car. The other parts of the construction is the same as those of the previous embodiment. Thus, like elements are designated by the same reference numerals and will not be described.

The rectifier $R_{f4}$ connected across the secondary winding $N_{24}$ is connected in parallel with a capacitor bank CLCB consisting of parallel-connected thyristors $Th_{B1}$ and $Th_{B2}$ with the polarities being in the reverse directions, a rush current suppressing reactor $L_B$, a damping resistor $R_B$ and a phase-advancing capacitor $C_B$.

The rectifier $R_{f3}$ is a mixing bridge circuit consisting of thyristors $Th_{31}$ and $Th_{32}$ and diodes $D_{31}$ and $D_{32}$ and the rectifier $R_{f4}$ is a mixing bridge circuit consisting of thyristors $Th_{41}$ and $Th_{42}$ and diodes $D_{41}$ and $D_{42}$.

The rectifiers $R_{f1}$ and $R_{f2}$ are controlled similarly as in the previous embodiment. The control of the rectifiers $R_{f3}$ and $R_{f4}$ is performed similarly as in the rectifiers $R_{f1}$ and $R_{f2}$, but independently by detecting the currents in the motors $M_4$ to $M_6$ with DC current transformers $DCT_4$ to $DCT_6$.

Figure 10:
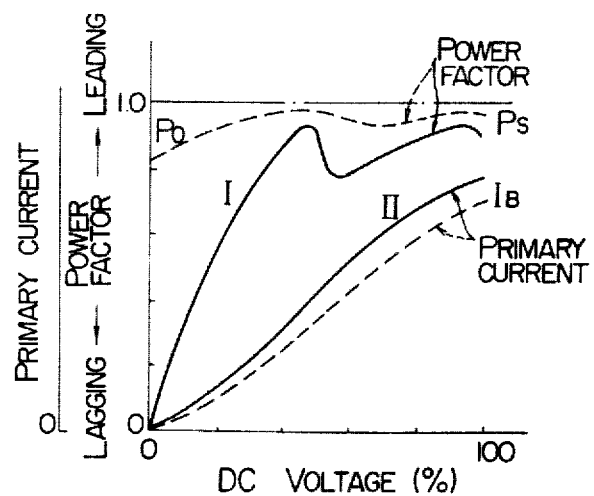
FIG. 10 is a graph useful for explaining its characteristics.

The motors $M_1$ to $M_3$, and $M_4$ to $M_6$ are controlled separately on each track because of suppressing to the utmost the occurrence of slip and sliding due to the shaft weight moving phenomenon peculiar to the electric car. However, the motors are usually controlled in substantial synchronism with each other, and thus approximately the same voltage is applied to the motors $M_1$ to $M_3$ and $M_4$ to $M_6$. The relation among the DC voltage, the primary current of transformer and its power factor is shown in FIG. 10 by solid lines II and I similar to FIG. 7 by solid lines II and I.

On the other hand, the capacities of the CLCA and CLCB are assumed to be ½ the value necessary for each power factor of primary current at the maximum DC voltage to be made sufficiently close to 1. Thus, the primary current and its power factor when the thyristors $Th_{A1}$, $Th_{A2}$, $Th_{B1}$ and $Th_{B2}$ are turned on are illustrated by the broken lines in FIG. 4. It will easily be understood that when either the thyristors $Th_{A1}$, $Th_{A2}$ or the thyristors $Th_{B1}$, $Th_{B2}$ are turned on, the primary current and its power factor take intermediate values between the broken and solid lines as shown in FIG. 4.

In the embodiment of FIG. 6, there is thus provided the level detector $LD_2$ in addition to the $LD_1$ for detecting the output of the current transformer Ct for detection of primary current of transformer. When the $LD_2$ produces output, the thyristors $Th_{B1}$ and $Th_{B2}$ are turned on.

Figure 7:
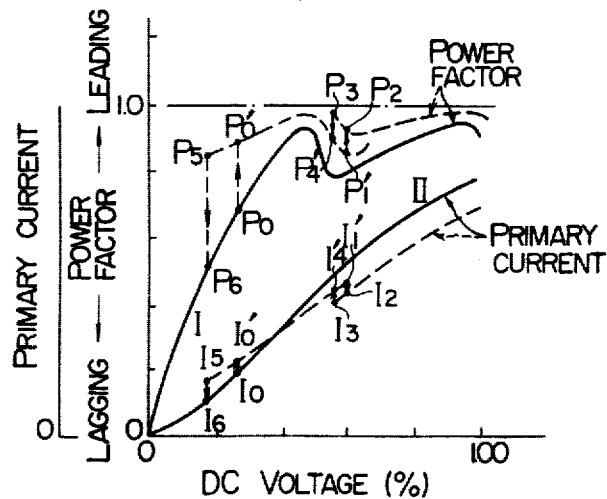
FIG. 7 is a graph useful for explaining its characteristics.

The operation level of the level detector $LD_2$ is set to the value $I_o$ of primary current of transformer as shown in FIG. 7. If the primary current exceeds $I_o$, the level detector $LD_2$ produces output, turning on the thyristors $Th_{B1}$ and $Th_{B2}$, so that the series circuit of the reactor $L_B$, resistor $R_B$ and capacitor $C_B$ becomes connected in parallel with the secondary winding $N_{24}$. Thus, the primary current and its power factor are changed from $I_o$ and $P_o$ to $I_o'$ and $P_o'$, respectively. Here, the return level of the level detector $LD_2$ has a hysteresis so as to be $I_5$ of primary current.

When the DC voltage is further increased after the level detector $LD_2$ has operated, the power factor is changed from $P_o'$ to $P_4'$, thus substantially improved more than in the solid line I. In this case, the filtering effect of the series circuit of the reactor $L_B$ and capacitor $C_b$ remarkably decreases harmonics which the rectifier $R_{f4}$ generates.

If the operation level of the level detector $LD_1$ is set to $I_1'$ or primary current and the return level to $I_3$, when the primary current exceeds $I_1'$, the thyristors $Th_{A1}$ and $Th_{A2}$ are turned on and the series circuit of the reactor $L_A$, resistor $R_A$ and capacitor $C_A$ is connected in parallel with the secondary winding $N_{22}$. As a result, the primary current and its power factor changes from $I_1'$ and $P_1'$ to $I_2$ and $P_2$, respectively. The power factor is more improved and harmonics are further reduced.

In the case of reducing the DC voltage, when the primary current is reduced to less than $I_3$, the level detector $LD_1$ is returned to the original state, turning off the thyristors $Th_{A1}$ and $Th_{A2}$. Thus, the primary current and its power factor are changed from $I_3$ and $P_3$ to $I_4'$ and $P_4'$, respectively. When the primary current is decreased to less than $I_5$, the primary current and its power factor change from $I_5$ and $P_5$ to $I_6$ and $P_6$, respectively. Therefore, leading power factor in the range where the DC voltage is relatively small and unnecessary loss due to phase advancing circuit current can be prevented from occuring.

According to this embodiment, since the CLCA and CLCB are each controlled to turn on and off at two set positions, more precise control can be performed than in the embodiment of FIG. 3 as apparent from FIG. 7 relative to FIG. 4, and power factor can be further improved.

It is apparent that the capacitor bank in this embodiment may be the circuit of FIG. 5A or 5B if necessary.

Figure 8:
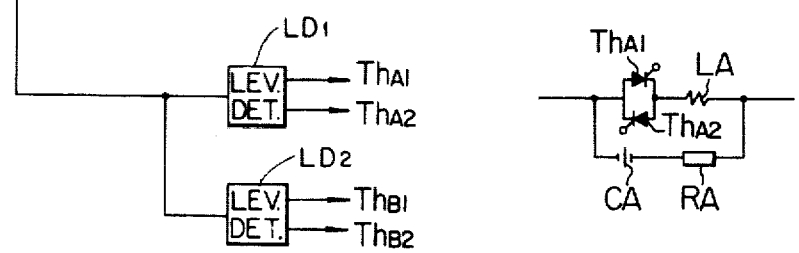
FIG. 8 shows still another modification of the capacitor bank.

While the capacitor bank in this embodiment is formed by connecting the phase advancing capacitor in series with the thyristors parallel connected with the polarities being in the reverse directions, this capacitor bank may be formed by parallel connecting a series circuit of the phase advancing capacitor $C_A$ and the damping resistor $R_A$ and a series circuit of the phase lagging reactor $L_A$ and parallel connected thyristors $Th_{A1}$ and $Th_{A2}$ with their polarities arranged in the reverse directions as shown in FIG. 8.

Although it is apparent that if in this embodiment the thyristors $Th_{A1}$, $Th_{A2}$ or $Th_{B1}$, $Th_{B2}$ are controlled in phase, the power factor improving effect can be continuously controlled, the rush current flowing into the capacitor $C_A$ upon turning-on of thyristors is relatively large and thus the phase control will increase harmonics. Therefore, it is practical to control thyristors to turn on and off as described above.

In the capacitor bank in FIG. 8, since the resonant reactor $L_A$ is selected to have a relatively large impedance approximately equal to that of the capacitor $C_A$, the rush current when the thyristors $Th_{A1}$ and $Th_{A2}$ are turned on is very small and thus does not increase harmonics. In addition, the capacitor $C_A$ always acts through the resistor $R_A$, and thus is very effective to absorb harmonics. Consequently, use of the circuit of FIG. 8 will continuously control power factor improving effect without increasing harmonics.

Figure 9:
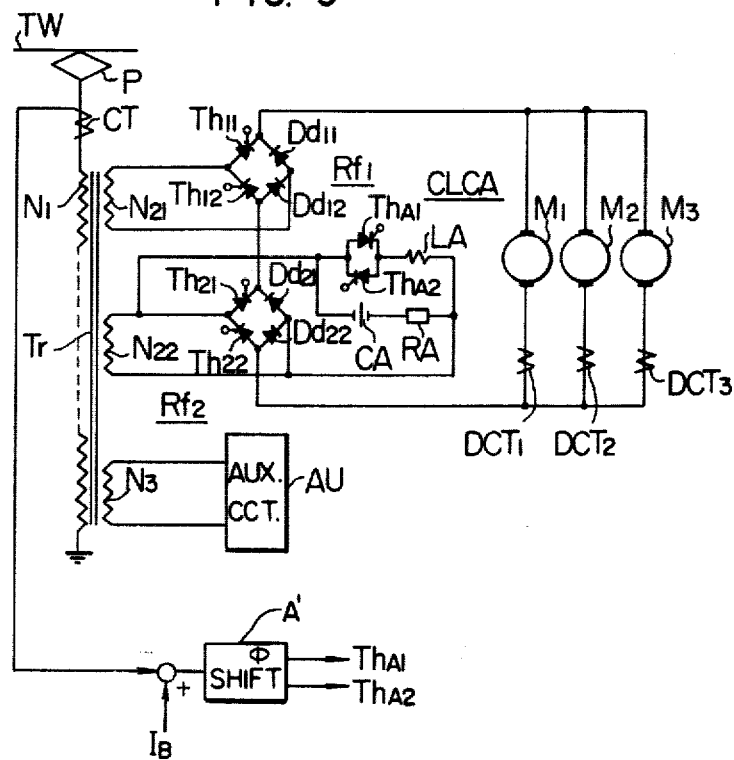
FIG. 9 shows still another application of the invention to an AC electric car.

FIG. 9 shows an embodiment of the present invention which employs the circuit of FIG. 8. This embodiment is different from the foregoing embodiment in that the circuit of FIG. 8 is used for the CLCA and the thyristors $Th_{A1}$ and $Th_{A2}$ are controlled to turn on and off by the amplifying phase shifter A' to which is supplied the remainder resulting from subtracting the bias input $I_B$ from the output of the current transformer CT. Other construction and operation are the same as in the previous embodiment and thus will not be described.

In this embodiment, the bias input $I_B$ is applied to the amplifying phase shifter A', which thus produces output to turn on the thyristors $Th_{A1}$ and $Th_{A2}$ when the primary current of transformer is zero. Thus, if the power factor of the parallel circuit consisting of the reactor $L_A$ and the series circuit of the capacitor $C_A$ and the resistor $R_A$ is made slightly leading so as to compensate for lagging of power factor of the auxiliary circuit AU, the power factor of the primary winding of transformer can be made relatively close to 1 as shown by $P_o$ in FIG. 10.

When the DC voltage is increased to increase the primary current, the output of the amplifying phase shifter A' makes the conducting angle of the thyristors $Th_{A1}$ and $Th_{A2}$ be gradually decreased. Therefore, the power factor of the capacitor bank is made further leading, and since the lagging power factor component of the rectifier $R_{f2}$ is increased by the increase of the DC voltage, this is compensated for with the result that the power factor of primary current is kept at approximately 1.

Then, when the DC voltage reaches the maximum, the primary current becomes $I_B$ and thus the input to the amplifying phase shifter A' is zero, turning off the thyristors $Th_{A1}$ and $Th_{A2}$. That is, in the capacitor bank, the series circuit of the capacitor $C_A$ and the resistor $R_A$ acts. Thus, if the capacity thereof is preset to a value, the power factor of primary current can be made to be $P_s$ approximately close to 1.

In other words, according to this embodiment, continuous control can be performed so that the power factor of primary current can always be about 1 and never be advanced in phase irrespective of the value of the DC voltage. Thus, approximately ideal power factor improving effect can be attained.

In the above embodiment, although the primary current is detected by the current transformer CT, it is instead possible to use the sum of the outputs of the DC current transformers $DCT_1$ to $DCT_6$ which are provided for motor current control. If it is done, the current transformer CT can be omitted.

Moreover, although in the above embodiment the capacitor bank is connected or disconnected by detecting the primary current or motor current, it is of course preferable to connect or disconnect it by detecting the power factor of primary current.

Figure 11:
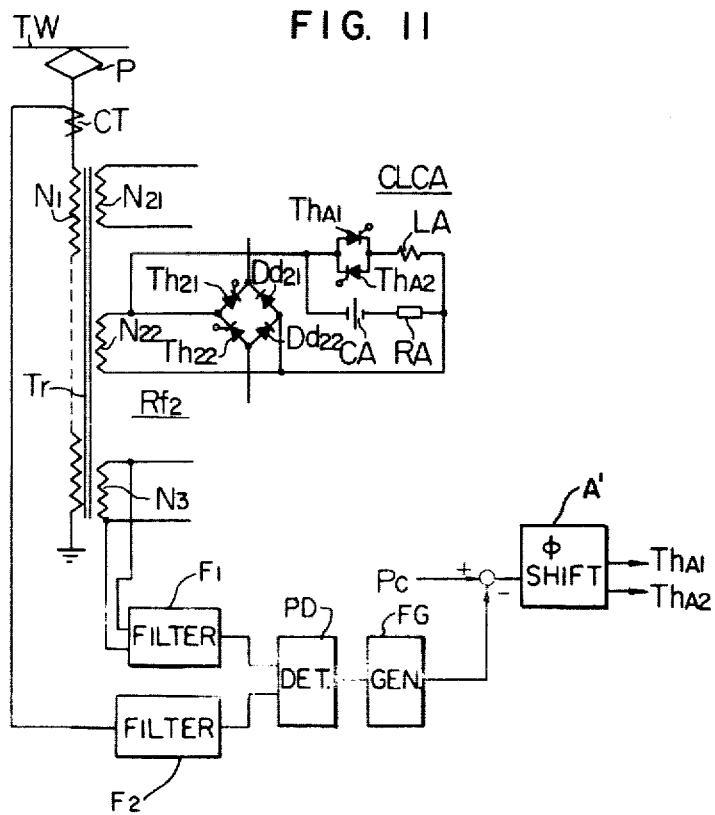
FIG. 11 show further another application of the invention to an AC electric car.

FIG. 11 shows an embodiment of the invention which has realized the above idea. The circuit arrangement is the same as that of FIG. 9 except the control circuit for turning on the thyristors $Th_{A1}$ and $Th_{A2}$.

Specifically, the firing control circuit for the thyristors $Th_{A1}$ and $Th_{A2}$ is constructed so that the primary current of transformer is detected by the current transformer CT and the detected signal is supplied to a phase difference detector PD through a fundamental wave filter $F_2$, while a voltage proportional to the voltage across the primary winding $N_1$ is induced in the tertiary winding $N_3$ and supplied through a fundamental wave filter $F_1$ having the same characteristics as those of the filter $F_2$, to the phase difference detector PD, the output of which is supplied to a cosine function generator FG, the output of which is subtracted from the $P_c$ (equal to or less than 1), the resulting remainder being used for actuating the amplifying phase shifter A'.

With such arrangement, detection of phase difference $\theta$ is made between the fundamental waves of the primary voltage and current of the transformer Tr, and the value of cosine $\theta$ is produced by the function generator FG. Consequently, the thyristors $Th_{A1}$ and $Th_{A2}$ are controlled to turn on and off by the action of the amplifying phase shifter A' so that the cosine $\theta$, or the power factor of primary current becomes equal to the $P_c$. If $P_c$ is 1, the power factor of primary current can be kept at a value close to 1 irrespective of the DC voltage value, which is ideal for improving power factor.

It will be apparent that many modifications and variations may be effected without departing from the scope of the novel concepts of this invention.

What is claimed is:

1. A power factor improving apparatus for power converter comprising:
    a transformer having a primary winding connected to an AC power supply and a plurality of secondary windings;
    a power converter having a plurality of controlled rectifying circuits, the AC sides of which are each connected to said respective secondary windings and the DC sides of which are connected in cascade with respect to a DC load;
    control means for phase-controlling one of said plurality of controlled rectifying circuits so that two or more of said plurality of controlled rectifying circuits are never phase-controlled at the same time and for selectively fixing the other ones to a minimum output state or a maximum output state; and
    a capacitor bank for improving the power factor of said power converter;
    wherein means is provided for connecting said capacitor bank to only one of said secondary windings to which one of said controlled rectifying circuits is connected.

2. A power factor improving apparatus for power converter according to claim 1, which further comprises means for actuating said means for connecting said capacitor bank to said secondary windings, only during the period in which at least one of said controlled rectifying circuits is fixed to the maximum output condition and at least another one of said controlled rectifying circuits is phase-controlled.

3. A power factor improving apparatus for power converter according to claim 1, which further comprises means for actuating said means for connecting said capacitor bank to said one of the secondary windings, when the current of said primary winding has arrived at a predetermined value.

4. A power factor improving apparatus for power converter according to claim 1, which further comprises means for connecting said capacitor bank in response to the fact that the currents flowing through said DC load have arrived at a predetermined value.

5. A power factor improving apparatus according to claim 1, which further comprises means for connecting said capacitor bank in response to the fact that the power factor of current flowing through said primary winding has reduced to a predetermined value.

6. A power factor improving apparatus for power converter according to claim 1 wherein said capacitor bank comprises a series circuit of parallel-connected thyristors with their polarlities being arranged in the reverse directions, a capacitor, a reactor and a resistor.

7. A power factor improving apparatus for power converter comprising:
    a transformer having a primary winding connected to an AC power supply and a plurality of secondary windings;
    a power converter having a plurality of controlled rectifying circuits, the AC sides of which are each connected to said respective secondary windings and the DC sides of which are connected in cascade with respect to a DC load;
    control means for phase-controlling a predetermined one of said plurality of controlled rectifying circuits and selectively fixing the other ones of the controlled rectifying circuits to either of the minimum and maximum output states; and
    capacitor banks for improving the power factor of said power converter;
    wherein means is provided for connecting said capacitor banks to the only one of said secondary windings to which a predetermined one of said controlled rectifying circuits is connected.

8. A power factor improving apparatus for power converter comprising:
    a transformer having a primary winding connected to an AC power supply and a plurality of secondary windings,
    a power converter having a plurality of controlled rectifying circuits, the AC sides of which are each connected to said secondary windings and the DC sides of which are connected in cascade with respect to a DC load;
    control means for phase-controlling said plurality of controlled rectifying circuits stage by stage then, after the output of a currently phase-controlled rectifying circuit has reached the maximum value, fixing this controlled rectifying circuit to that condition, and then phase-controlling the next controlled rectifying circuit; and
    capacitor banks for improving the power factor of said power converter;
    wherein means is provided for connecting said capacitor bank to only one of said secondary windings which is connected to a controlled rectifying circuit finally phase-controlled when the output of the power converter is increased by said control means.

9. A power factor improving apparatus for power converter comprising:
- a transformer having a primary winding connected to an AC power supply and a plurality of secondary windings;
- a plurality of power converters connected to the secondary windings of said transformer; and
- capacitor banks for improving the power factor of said power converters;
- each of said plurality of power converters comprising:
  - a plurality of controlled rectifying circuits, the AC sides of which are each connected to said respective plural secondary windings and the DC sides of which are connected in cascade with respect to a DC load; and
  - control means for phase-controlling only one of said plural controlled rectifying circuit so that two or more of said plural controlled rectifying circuits are never phase-controlled at the same time and for selectively fixing the other ones to either of the minimum and maximum output states;
- wherein means having a plural number of said capacitor banks corresponding to the number of said power converters is provided for connecting said capacitor banks to the secondary windings which are connected to said rectifying circuits in the power converters, respectively, and means for actuating only part of said plural number of connecting means when said power converters are at a relatively low output state.

10. A power factor improving apparatus for power converter according to claim 9, which further comprises means for actuating all said plural connecting means when said power converter is at a relatively high output state.

* * * * *